United States Patent [19]

Warriner et al.

[11] Patent Number: 4,718,155
[45] Date of Patent: Jan. 12, 1988

[54] BEARINGS

[76] Inventors: Joseph F. Warriner, 134 Marys Mead, Hazlemere, High Wycombe, Buckinghamshire, England; Warren E. Snyder, 13800 Watertown Plank Rd., Elm Grove, Wis. 53122

[21] Appl. No.: 811,930

[22] Filed: Dec. 20, 1985

[30] Foreign Application Priority Data

Jan. 5, 1985 [GB] United Kingdom ............... 8500282

[51] Int. Cl.⁴ .............................................. B21D 53/10
[52] U.S. Cl. ................................................ 29/149.5 S
[58] Field of Search ................. 29/149.5 DP, 149.5 S, 29/149.5 R; 384/283, 284, 285

[56] References Cited

U.S. PATENT DOCUMENTS

| | | | |
|---|---|---|---|
| 2,648,580 | 8/1953 | Lignian | 29/149.5 R |
| 2,757,055 | 7/1956 | Davis | 384/284 |
| 4,400,099 | 8/1983 | Ehrentraut | 384/283 |
| 4,561,787 | 12/1985 | Ehrentraut et al. | 384/295 |

FOREIGN PATENT DOCUMENTS

706264 3/1954 United Kingdom ............... 384/283

Primary Examiner—Timothy V. Eley
Attorney, Agent, or Firm—Sigalos & Levine

[57] ABSTRACT

A process is described for the production of bearings for sustaining high loads, the bearings having indentations filled with soft overlay alloy. The indentations are produced by peening or embossing. The peening is preferably performed with rounded ceramic shot of 0.25 to 0.5 mm diameter. Indentations should preferably be between 0.01 and 0.05 mm deep. In one embodiment a bearing is described having alloy comprising a steel-backed aluminium-based bearing alloy having a composition of, for example, Al-Sn20-Cu1 and a soft Pb-Sn10 overlay there also being an interlayer of 3 to 5 μm of nickel between the bearing alloy and the overlay. Bearing surfaces having a continuous overlay or a composite surface comprising randomly-shaped areas of bearing alloy and overlay may be produced.

11 Claims, 14 Drawing Figures

BEARINGS

The present invention relates to plain bearings and particularly to plain bearings having overlays.

Bearings having a steel or other hard metal backing and a layer of bearing material thereon comprising a copper or aluminium based alloy frequently also have a soft metal alloy overlay forming the shaft mating surface. Such soft overlays lend, amongst other things, the properties of comformability, dirt embeddability and seizure resistance to the bearing.

Soft metal overlays, however, also have their own disadvantages. Being soft, the overlay has low resistance to fatigue and abrasion. The problem of overlay abrasion and additionally corrosion has been exacerbated over recent years in the case of medium speed diesels. The use of heavier fuel oils has led to oil additives being used to lessen the effects of undesirable combustion products in the lubricating oil. This has increased both corrosion damage to the bearings and also wear due to the generation of abrasive particles. Overlay alloying constituents are prone to diffuse out of the overlay into the bearing material at their operating temperature. To combat corrosion overlays tend to have high levels of alloying additions of, for example, tin. Where, for example, lead-tin overlays are used on copper-base bearing materials, the tin content tends to diffuse out into the copper alloy thus lowering the corrosion resistance of the overlay. Solutions to this particular problem have involved the use of interlayers between the bearing material and the overlay to inhibit the diffusion of, for example, tin out of the overlay.

With aluminium-based bearing alloys interlayers of, for example, nickel or copper-based materials are frequently used as a layer to facilitate the deposition of overlays by electrolytic processes. Although this has solved one problem it has also introduced another. Where the overlay has been worn or corroded away to expose large continuous areas of nickel interlayer, there is circumstantial evidence to suggest that the bearing becomes prone to seizure with consequent damage to both the bearing and the shaft journal.

Various configurations of bearing material and overlays have been proposed over the years to provide a bearing surface having alternately exposed areas of soft alloy and harder bearing material such that in rubbing contact with the shaft journal a thin film of seizure-resistant soft alloy is transferred to the shaft and the harder bearing material. Configurations have included axial and circumferential slots and grooves, helical grooves and many types of holes or pockets filled with soft alloys or self-lubricating materials.

More recently, Ehrentraut in U.S. Pat. No. 4,400,099 described a bearing for heavy loads comprising a backing shell with a bearing material on the backing and the bearing material having formed therein axially spaced-apart grooves. The grooves subtending an acute angle of a maximum of 15° to the circumferential direction and which are filled with a soft bearing alloy. Various dimensional and mathematical restrictions are placed upon the geometry of the machined grooves and the spacing of the grooves in relation to each other. The grooves are machined into the bearing surface as a continuous helix which are then filled with a soft bearing alloy either with or without an interlayer in the grooves. Such bearings have given good results but, however, are difficult and very expensive to manufacture and are still prone to soft overlay erosion due to the grooves being essentially continuous and in the circumferential direction. The problem of eventually exposing extensive continuous areas of interlayer in the form of circumferential bands where such is included also still remains. A further disadvantage with this type of bearing is that where hard ferrous debris is forced to embed in the well-defined grooves of soft overlay the corresponding area of the shaft journal will become preferentially worn and roughened. The effect of this is that where a new bearing is installed without regrinding of the shaft the new bearing will be badly damaged virtually immediately on running the engine. Due also to the spiral grooves being very fine it will not be so easy for such a bearing to accommodate large dirt particles.

It is an object of the present invention to provide a bearing having reduced susceptibility to seizure on exposure of an interlayer between the overlay and the bearing material.

A further object of the present invention is to provide a bearing which overcomes the problems of difficulty and expense of manufacture by providing a less costly and more easily controlled manufacturing method.

A still further object is to provide a bearing having reduced susceptibility to soft overlay erosion by incorporating the overlay into the bearing surface in a discontinuous manner.

According to one aspect of the present invention a process of the production of a bearing comprising a relatively hard bearing material having a relatively softer overlay alloy thereon and which bearing is suitable for sustaining high loads comprises introducing indentations into the surface of the relatively hard bearing material prior to coating with overlay, filling the indentations with the relatively softer overlay alloy and finally machining the bearing surface to required dimensions.

In one embodiment of the process an interlayer is placed between the relatively hard bearing material and the relatively soft overlay.

The indentations in the surface of the relatively hard bearing alloy may be produced, for example, by known peening or embossing techniques. Embossing tools may be based on rollers having protrusions on an outer cylindrical surface, the protrusions having any desired shape and geometry. Different rollers may employ different densities of surface protrusions in order that the surface area ratio of harder bearing alloy to overlay alloy may be controlled.

Peening techniques used to produce the surface indentations may be any suitable technique known in the peening art. Peening techniques using rounded shot comprising glass, ceramic, steel or other metals may be employed. Alternative technique utilising peening tools comprising rotatable flails may also be employed.

Where shot peening is employed as the indenting process rounded ceramic shot of about 0.15 to 1 mm diameter may be used. Preferably, however, a shot size of 0.25 to 0.5 mm may be used. Such shot comprising zirconia in a silica matrix has been found to be especially advantageous in producing a desired surface topography.

Experiments with chilled iron shot and grit has revealed these materials to be prone to shattering on impact with the result that angular ferrous debris becomes embedded in the bearing alloy surface. This is undesirable in a bearing surface. Similarly glass beads have been found to break down more easily than ceramic resulting in the embedment of angular glass particles. It has been found that for optimum control in producing the desired surface topography and minimising embedded contaminants the maintenance of rounded particles in the peening medium is of great importance.

It has been found that for optimum surface topography and bearing performance the bearing surface should be shot peened once over 100% of its area. Secondary peening of already peened bearing alloy tends to level the surface producing a less desirable surface topography.

An alternative method to shot peening is to use devices having peening balls attached to the ends of flexible strands, the strands themselves being attached to a rotatable shaft. Rotation of the shaft causes the balls to strike the bearing surface. An example of such a flail-type device is the Flex-Hone (trade mark).

In one embodiment of the process, the overlay alloy may be machined back in order to expose alternate areas of overlay and relatively harder bearing alloy.

According to a second aspect of the present invention, a bearing for sustaining high loads comprises a relatively hard bearing material having indentations therein, the indentations being filled with a relatively softer overlay alloy.

In an alternative embodiment of the bearing there is an interlayer interposed between the relatively hard bearing material and the softer overlay. Such interlayers may, for example, comprise nickel or nickel alloys, copper or copper alloys, silver or silver alloys.

The relatively hard bearing material may be aluminium or copper based and the overlay alloy may be any known in the art and deposited by any known techniques such as, for example, electroplating, casting chemical vapour deposition and various forms of physical vapour deposition.

In an embodiment where the indentations have been produced by shot peening and the overlay has been machined back to expose alternate areas of harder and softer alloys, such areas will have random shape and dimensions owing to the nature of the shot peening process.

In a further alternative embodiment of the bearing the overlay may be bored back only sufficiently to form a smooth and uniform overlay bearing surface and not exposing any of the underlying interlayer or relative harder bearing material. The advantage of this embodiment is that where a continuous overlay surface is required, in-service wear of the overlay does not eventually expose large continuous areas of interlayer thus minimising any potential seizure hazard.

Where surface indentations are produced by a peening tool comprising a rotatable flail, the indentations may be of a more regular pattern. In some embodiments, depending on what ratio of harder bearing material to softer overlay it is desired to produce on the final bearing surface, the individual indentation pits may not be discretely sited and thus indentations may be partially coincident.

In some circumstances, it may be desirable to give a light machining cut on the peened surface of the harder bearing material prior to the deposition of any interlayer and the overlay in order to give enhanced control of the relative surface area ratios. The lips raised around the peened indentations may, in some instances, be removed by machining prior to interlayer or overlay deposition.

Peening indentations may be up to about 0.15 mm deep, but preferably may be 0.01 mm to 0.05 mm deep.

In order that the present invention may be more fully understood, examples will now be given by way of illustration only with reference to the accompanying Figures of which.

Referring now to the Figures and where similar features are denoted by common reference numerals.

Figure 1:
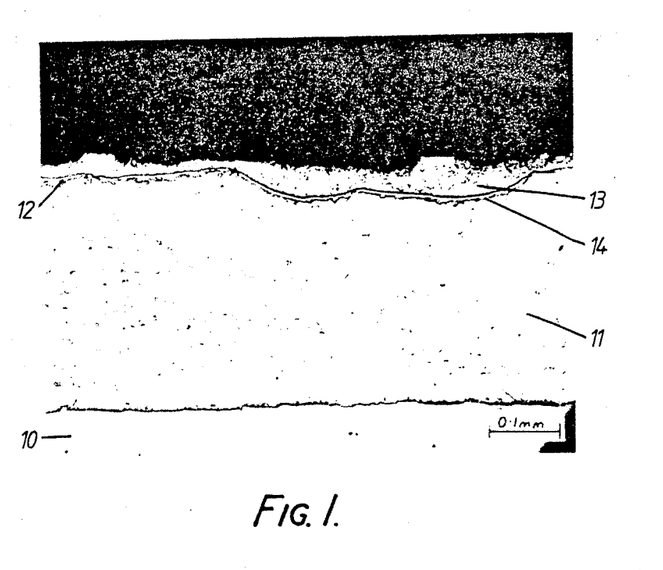
FIG. 1 shows a photomicrograph of a microsection through a first bearing having an interlayer and overlay in accordance with the present invention.
Figure 2:
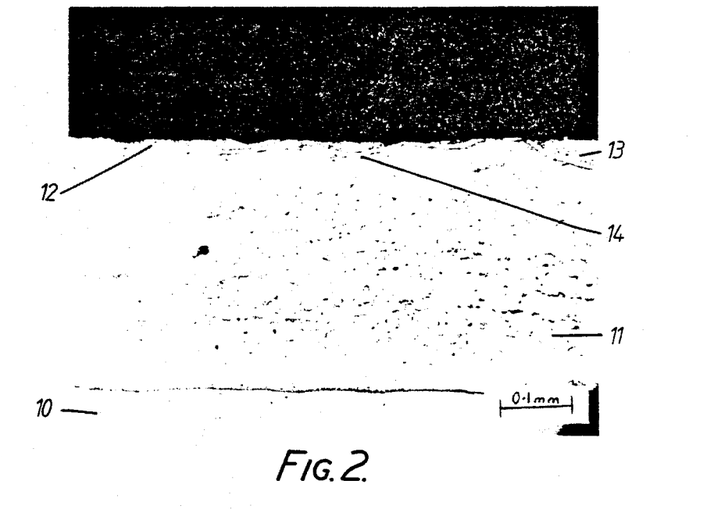
FIG. 2 shows a photomicrograph of a microsection through an alternative bearing having an interlayer and overlay in accordance with the present invention.

FIGS. 1 and 2 show a bearing having a steel backing 10, a bearing alloy 11 comprising in wt. % Al-Sn20-Cu1, a nickel interlayer 12 and an overlay 13 comprising Pb-Sn10.

Prior to electroplating of the barrier 12 and the overlay 13 the machined and sized surface of the bearing alloy 11 was shot peened with ceramic beads to produce an indented surface 14 on the alloy 11. Peak to valley height varied from 0.025 to 0.05 mm. The ceramic beads comprised approximately 60 to 70% zirconia in a vitreous silica matrix and were of 0.28 mm diameter.

The indented surface 14 was cleaned, prepared and electroplated in a known manner with the interlayer 12 and overlay 13. Overlay 13 thickness was initially a nominal 0.05 mm which was then machined back to a nominal 0.025 mm to give a required bore size. As may be seen in FIG. 1, both the nickel interlayer 12 and overlay 13 are continuous.

FIG. 2 shows a bearing produced by the same procedure as that in FIG. 1, but the overlay 13 has been bored back by a nominal 0.05 mm. It may be seen from FIG.

Figure 3:
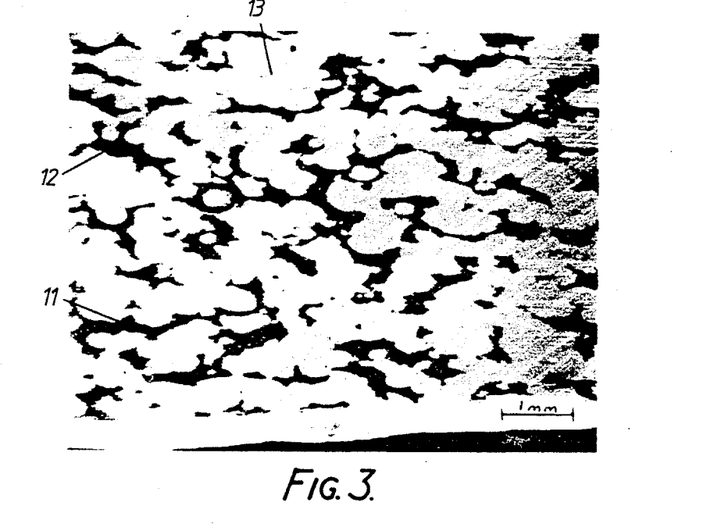
FIG. 3 shows a photomicrograph of the bearing surface of the bearing shown in FIG. 2.

3 also that the surface now comprises intermittent areas of overlay 13, nickel barrier 12 and bearing alloy 11. FIG. 3 shows a view of the surface produced (the surface has been etched). The lighter areas are overlay 13, whilst the darker areas are bearing alloy 11, one being bounded from the other by the nickel interlayer 12.

Testing of bearings of the type shown in FIGS. 2 and 3 was carried out in known "Sapphire" fatigue and seizure testing machines. Seizure occurred on two test bearings at 240 and 260 MPa. These figures for seizure compared equally with the best results obtained on bearings produced according to Ehrentraut in U.S. Pat. No. 4,400,099. Wear and fatigue testing, however, showed only small isolated pitting of the overlay in bearings according to the present invention under conditions at which the Ehrentraut type bearing showed significant overlay erosion due, possibly, to the circumferential oil flow and the continuous circumferential orientation of the overlay alloy filled grooves. "Sapphire" fatigue tests conducted on bearings manufactured to the same specification as above gave a mean a rating of 111 MPA.

Figure 4:
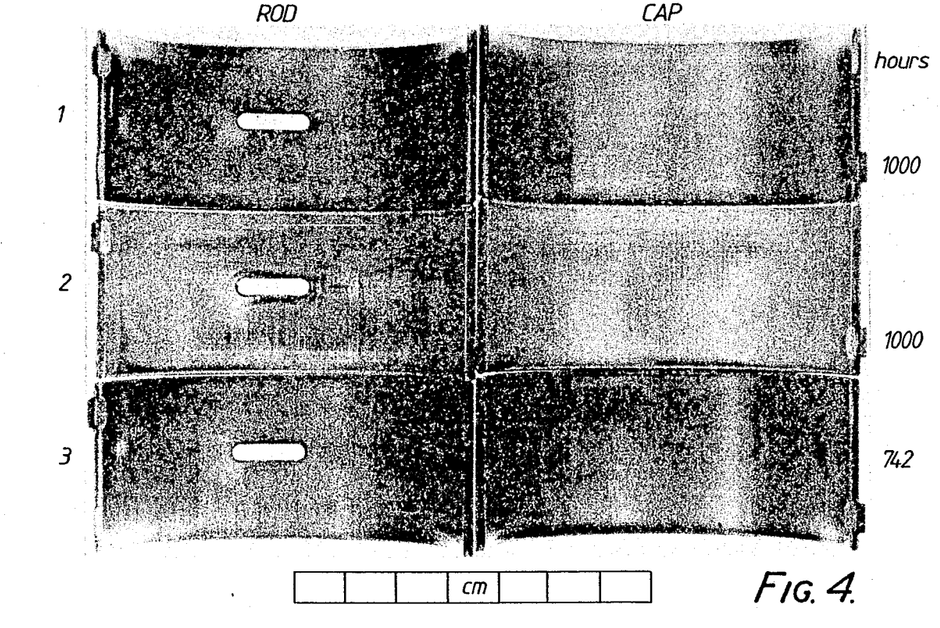
FIG. 4 shows a photograph of large end bearings (cap and rod halves) from cylinders 1, 2 and 3 of a six cylinder 363 cu. in capacity diesel engine.
Figure 5:
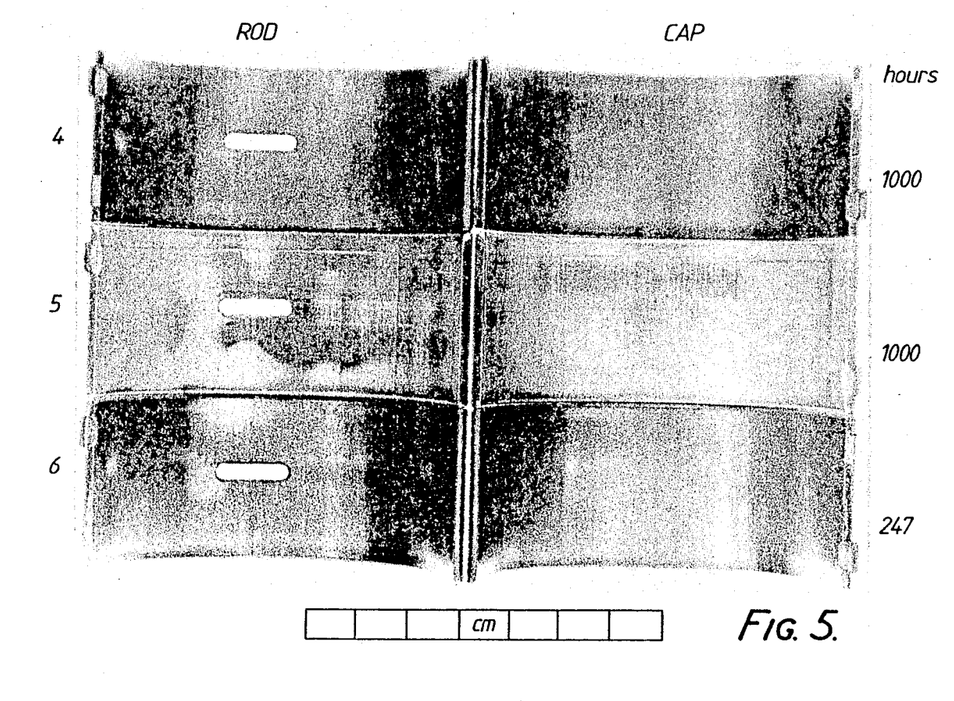
FIG. 5 shows a photograph of the bearings from cylinders 4, 5 and 6 of the same engine as the bearings shown in FIG. 4.

Further large end bearings of the type shown in FIGS. 2 and 3 were produced for trials in a Ford Dover 363 cu.in. turbocharged diesel engine. The production conditions for the bearings included peening 100% of the bearing surface with 0.28 mm diameter ceramic shot composed of zirconia in a silica matrix. The bearing material was Al-Sn20-Cu1 on a steel backing. Bearing overall diameter was approximately 79 mm. The intensity of peening was such as to produce indentations in the bearing surface of up to 0.025 mm. The indented surface was then overlay plated with a nickel interlayer of 3 to 5 μm thickness and the nominal overlay thickness deposited was 0.075 mm. The overlay plated bearings were then bored back to the original pre-peening bore dimension to leave a composite surface comprising overlay, nickel and bearing alloy. Standard control bearings were also included in the engine build the bearings comprising steel-backed Al-Sn20-Cu1 smooth bored without overlay. Engine test conditions were full load of 150 b.h.p. and full speed of 2400 rev./min. for 55 minutes, idle for 5 minutes with full water cooling to reduce temperatures then resumption of full load, full speed for 55 minutes. etc. The engine test was continued for 1000 hours, the engine being stopped at approximately 250 and 750 hours for routine inspection of bearings. Bearings of the present invention after 250 and 750 hours showed no signs of damage or wear whereas the control bearings showed significant circumferential dirt scoring. Those bearings removed at 250 and 750 hours were replaced with new bearings. The complete set of bearings removed from the engine at the end of the 1000 test are shown in the photographs at FIGS. 4 and 5. It may be seen from these bearings that the bearing conditions between 250, 750 and 1000 hours running is virtually indistinguishable.

Figure 6:
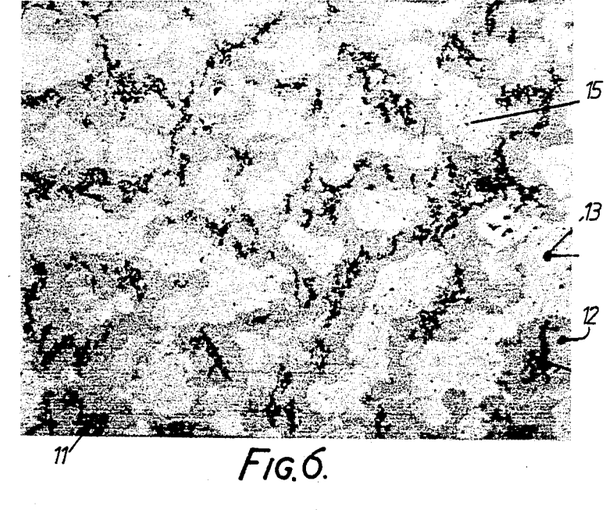
FIG. 6 shows a scanning electron microscope (SEM) photograph at X50 magn. of the surface of a bearing according to the present invention having completed 750 hours running in a 363 cu. in capacity diesel engine.
Figure 7:
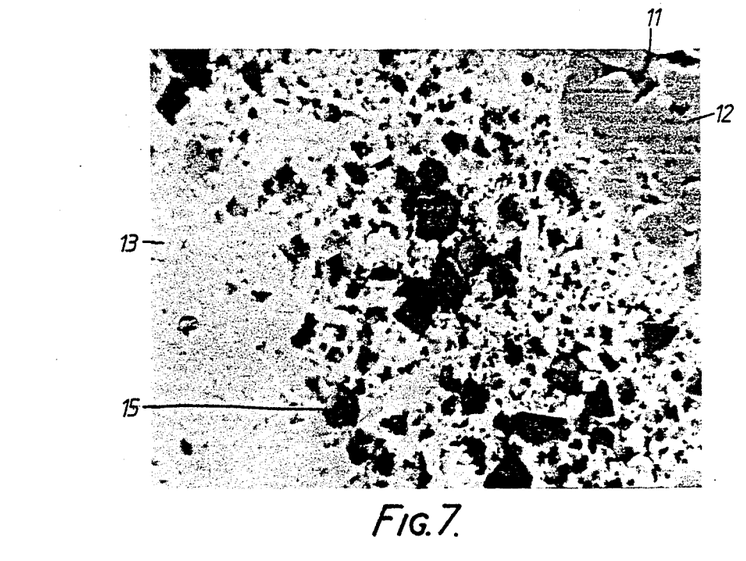
FIG. 7 shows an SEM photograph at X1000 magn. of the surface of the bearing shown in FIG. 6 and showing embedded dirt particles in the overlay phase.

FIG. 6 shows a photograph taken of the surface of one of the bearings removed from the test engine after 750 hours running. The surface comprises overlay 13, nickel 12 and bearing alloy 11. Within the overlay areas 13 may be seen dark specks 15. These are seen more clearly in FIG. 7 and are revealed as embedded dirt particles accumulated during engine running.

It is clear from the above tests that the process of the present invention provides a bearing having the benefits of an overlay without the problems of potential seizure due to large uninterrupted areas of nickel interlayer exposed as a result of overlay wear and erosion of which the latter two are significantly reduced compared with known overlay coated bearings.

Figure 8:
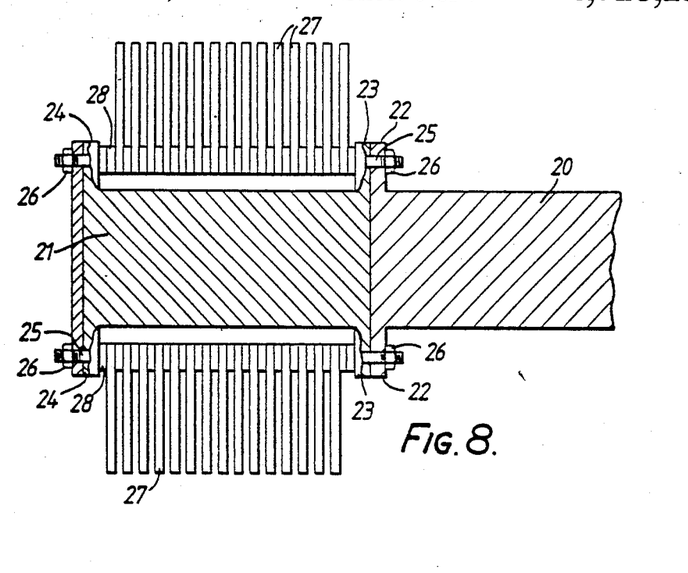
FIG. 8 shows a section through a schematic representation of a rotatable flail peening tool.

FIG. 8 shows a section through a rotatable flail device having a shaft 20 for holding in a lathe-type machine (not shown). The shaft 20 is axially attached to a body-part 21 by lugs 22 and 23 on the shaft 20 and body-part 21, respectively. Further lugs 24 on the body part 21 and axially aligned with the lugs 22 and 23 receive shafts 25 which are held in place by nuts 26. On the shafts 25 are flail elements 27 and spacers 28, the flail elements having holes 29 for mounting on the shafts 25 and are freely swingable thereon.

Figure 9:
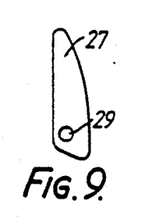
FIG. 9 shows a side elevation of a flail element from the tool FIG. 8.
Figure 10:
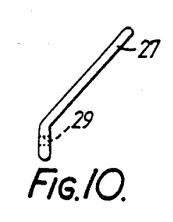
FIG. 10 shows an end elevation of an alternative flail element for the tool of FIG. 8.
Figure 11:
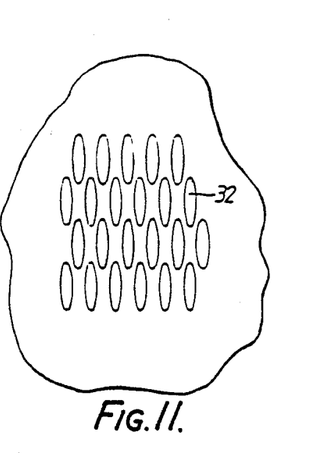
FIG. 11 shows a schematic representation of part of a bearing surface produced by the tool of FIGS. 8 and 9.

In operation, the flail device is mounted in a lathe chuck (not shown) and a bearing (not shown) is mounted in a movable lathe jig such that the bearing may be positioned to allow the heads of the flail elements 27 to strike the bearing surface during rotation of the device. Control of the indentation geometry and pattern may be achieved by variation of, for example, rotational speed of the device, number and spacing of the flail element and number of passes over the bearing surface, etc. A typical pattern which may be produced is shown in FIG. 11 which is a representation of a portion of a bearing surface. The pattern shown is produced by the flail element shown in FIG. 9 where the oval shaped indentations 32 are aligned in a substantially circumferential direction. The flail element shown in FIG. 10 produces an indentation pattern having the indentation orientation in a direction approximately 45° to the bearing axis. Indentation orientation may, of course, be modified by any suitably shaped flail, the heads of which may have any desired shape or imprint.

Figure 12:
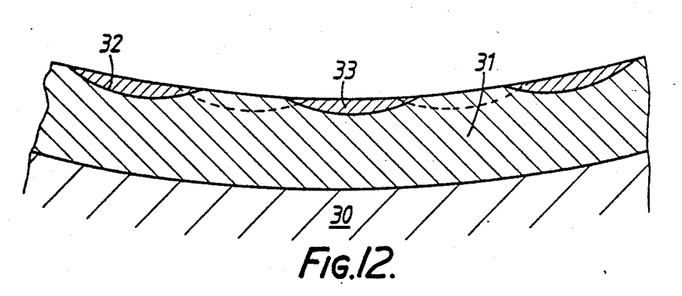
FIG. 12 shows a schematic cross-section of the bearing part shown in FIG. 11 with the indentations filled with overlay.
Figure 13:
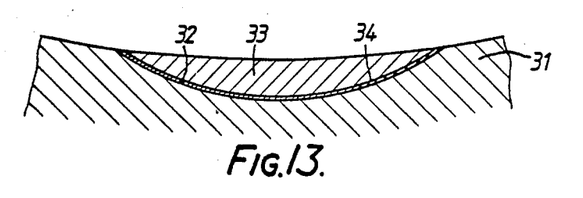
FIG. 13 shows a first alternative embodiment of the bearing of FIG. 12 with an interlayer between the harder bearing alloy and the overlay alloy filled indentation.
Figure 14:
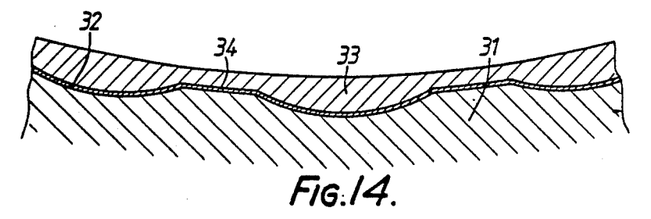
FIG. 14 shows a second alternative embodiment of the bearing of FIG. 12 showing a bearing surface having continous overlay alloy and an interlayer.

FIGS. 12, 13 and 14 show schematic sections through a bearing having an overlay in various alternative forms. FIG. 12 shows a bearing having a steel backing 30 on Cu-Pb26-Sn1.5 bearing material 31. Indentations 32 are formed in the bearing surface by a rotatable flail device such as that shown in FIG. 8. The bearing surface is then overlay plated with Pb-Sn10 which is then machined back to leave discrete pockets of overlay 33. In an alternative embodiment (FIG. 13) the indented bearing surface is first plated with a nickel interlayer 34 prior to overlay plating. Machining back of the overlay again leaves a surface having pockets of overlay 33 but with a nickel interlayer 34 lining each indentation 32.

FIG. 14 shows a similar embodiment to that of FIG. 13 except that the overlay 33 is merely machined to leave a smooth continuous overlay. In operation, wear of the overlay eventually exposes the nickel interlayer 34, but the barrier is neither continuous nor is the overlay totally exhausted, pockets of which remain to provide a seizure-resistance film.

In a further example of a bearing according to the present invention a pair of bearings were indented with a Flex-Hone (trade mark) device. The Flex-Hone comprised a multiplicity of 20 grit aluminium-oxide particles attached to flexible nylon bristles. The Flex-Hone was rotated at 720 rev./min. and the particles were allowed to impinge upon the surface of the pair of bearings for about 3 seconds. Paraffin lubricant was used, the Flex-Hone diameter was 57 mm and the bearing bore diameter was 54 mm. Bearing material was Al-Sn20-Cu1. After peening the bearings were electro-plated with a nickel interlayer to 3 μm thickness then overlay plated with Pb-Sn10 to 0.075 mm thickness. The overlay was then bored back by 0.050 mm to expose a composite surface of bearing alloy, nickel and overlay. Fatigue tests were carried out on the bearings on a "Sapphire" fatigue testing machine referred to above. The two bearings tested showed no fatigue damage at 117 MPa and 103 MPa. The means fatigue rating of unplated Al-Sn20-Cu1 is 85 MPa and that for conventional Al-Sn20-Cu1 with a Pb-Sn10 overlay and nickel interlayer but without an indented surface is between 100 and 105 MPa.

It is envisaged that the process of the present invention may be employed to produce bearings having enhanced seizure and wear-resistance during the initial running-in stage of a new engine. It is envisaged, for example, in bearings comprising alloys which do not normally require soft overlays to lightly indent the surface to a depth of 1–10 $\mu$m, or more preferably 2–6 $\mu$m and to deposit a layer of pure tin, for example, to form in effect a sacrificial overlay to aid the running-in of the bearing in the initial running stages. Examples of alloys to which such a process may be applied are those described in GB No. 2,144,149.

It has been found with bearings of the present invention that the peening or embossing process produces surface hardening of the bearing alloy which raises the fatigue strength over that of the standard alloy. Mere machining of grooves etc., into the bearing alloy surface does not confer this potential advantage.

It is further envisaged that the technique of indenting the bearing alloy surface may, under some circumstances, be carried out at the stage of flat blanks or strip, the semi-circular bearing being subsequently formed and machined prior to deposition of an interlayer and overlay.

We claim:

1. A process for the production of a bearing having a relatively harder bearing material with a relatively softer overlay alloy, said bearing being suitable for sustaining high loads, the process comprising the steps of:
   a. introducing indentations of random shape and dimensions into the surface of relatively harder bearing material by means of shot-peening with a rounded, shatter-resistant shot-peening medium, said indentations having a depth generally being between 0.01 and 0.05 mm,
   b. depositing an interlayer on said indented surface,
   c. depositing a layer of relatively softer overlay alloy on said interlayer, and
   d. machining said bearing to a required dimension.

2. A process according to claim 1 further comprising the step of utilizing ceramic as said rounded, shatter-resistant shot-peening medium.

3. A process according to claim 2 further comprising the step of utilizing zirconia in a silica matrix as said ceramic.

4. A process according to claim 1 further including the step of forming said shot-peening medium of particles from 0.15 to 1 mm in diameter.

5. A process according to claim 1 further comprising the step of selecting said interlayer material from the group consisting of nickel, nickel alloys, cooper, copper alloys, silver and silver alloys.

6. A process according to claim 1 further comprising the step of selecting said relatively harder bearing alloy from the group consisting of aluminum-based alloys and copper-based alloys.

7. A process according to claim 1 further comprising the step of machining said relatively soft overlay alloy to leave a smooth, continuous overlay phase on the surface of said bearing.

8. A process according to claim 1 further comprising the step of machining said relatively soft overlay phase after deposition to leave a bearing surface comprising randomly shaped areas of overlay interlayer and bearing alloy.

9. A process according to claim 1 furhter comprising the step of peening said bearing surface only once on areas that have not already been peened.

10. A process for the production of a bearing for use in an engine, said bearing having relatively hard bearing material and having enhanced seizure and wear resistance during the initial running in stage of a new engine, the process comprising the steps of:
    a. indenting the surface of said bearing to a depth of 1–10 $\mu$m with indentations of random shape and dimension, and
    b. coating said surface with a sacrificial overlay.

11. A process as in claim 10 further comprising the step of coating said surface with pure tin as said sacrificial overlay.

* * * * *